(12) United States Patent
Nash

(10) Patent No.: US 7,862,441 B2
(45) Date of Patent: Jan. 4, 2011

(54) SELF ALIGNING DIE

(75) Inventor: Derek J. Nash, Huntersville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 407 days.

(21) Appl. No.: 12/022,190

(22) Filed: Jan. 30, 2008

(65) Prior Publication Data

US 2009/0191977 A1 Jul. 30, 2009

(51) Int. Cl.
*B21J 13/02* (2006.01)
*B21H 3/02* (2006.01)
*B23G 5/04* (2006.01)

(52) U.S. Cl. .......................... 470/185; 470/66; 470/80; 408/219; 408/221

(58) Field of Classification Search .................. 470/10, 470/66, 67, 185–190, 80; 408/219, 220, 408/221
See application file for complete search history.

(56) References Cited

U.S. PATENT DOCUMENTS

| 4,472,095 A * | 9/1984 | Molina ......................... 470/19 |
| 4,927,302 A * | 5/1990 | Beaty ......................... 470/185 |
| 6,951,562 B2 * | 10/2005 | Zwirnmann .................. 606/80 |

FOREIGN PATENT DOCUMENTS

DE  4108691 A1 *  9/1992

* cited by examiner

*Primary Examiner*—Teresa M Bonk
(74) *Attorney, Agent, or Firm*—Dennis J. Williamson; Moore & Van Allen, PLLC

(57) ABSTRACT

The die has a bore that is generally sized to fit onto a like-sized stud. Threads are formed on the interior of the bore for cutting the threads on the stud. The die includes an integrated alignment mechanism to ensure that the die is aligned with respect to the stud as the die is rotated onto the stud.

16 Claims, 7 Drawing Sheets

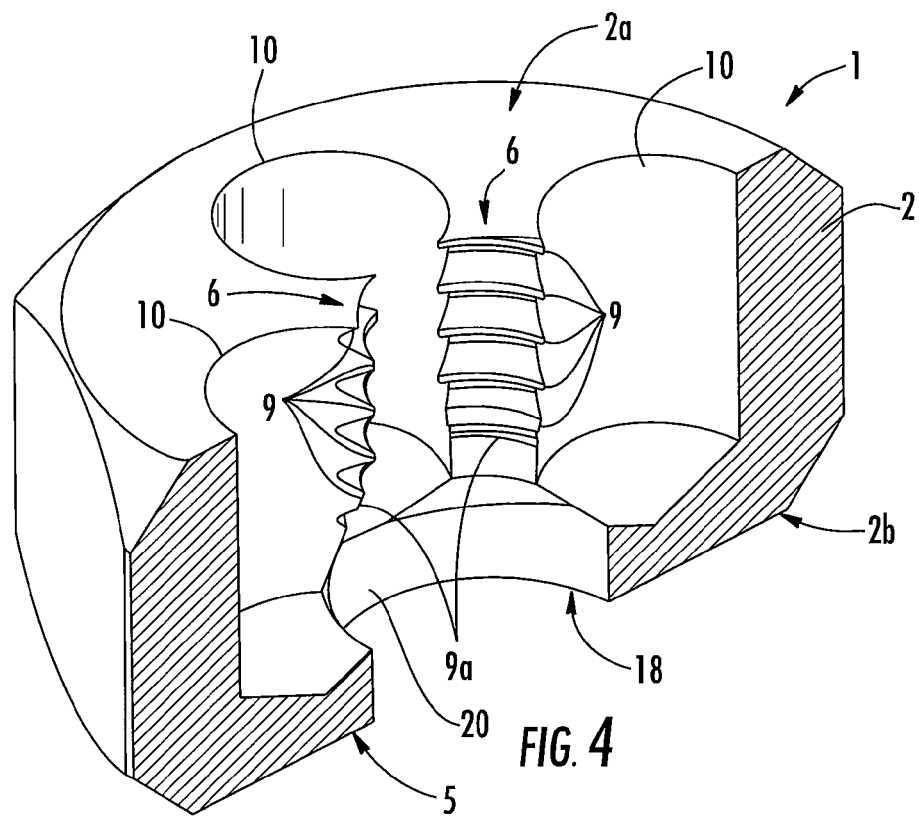
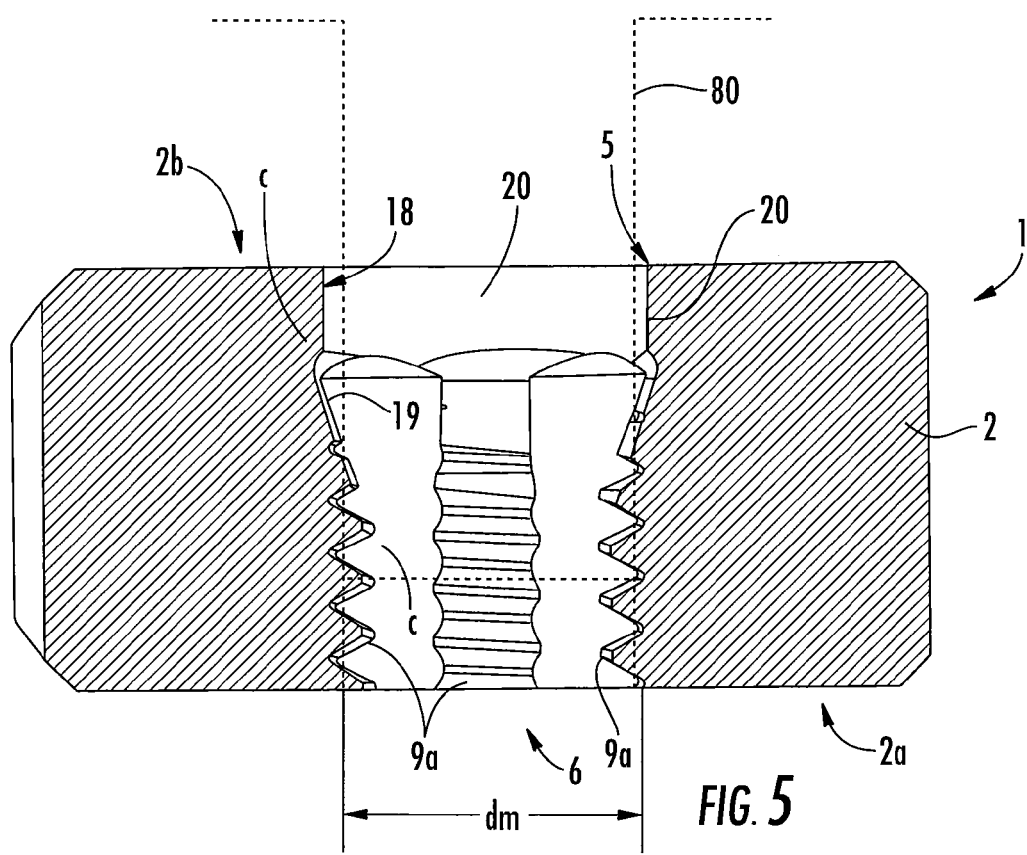

SELF ALIGNING DIE

The invention relates generally to dies for cutting or cleaning screwthreads.

Threaded dies are known for cutting or repairing and cleaning threads in a stud. These devices may be used to cut threads into virgin unthreaded stock or may be used to clean out and repair damaged, dirty or rusted threads in a previously threaded member. When used to cut threads the devices are often referred to as thread cutters and when used to clean or repair existing threads the devices are often referred to as thread chasers. These devices are referred to collectively herein as dies.

The dies typically have an internally threaded bore that is sized to fit onto a like-sized stud. The die may include peripheral face that is intended to be gripped by a turning tool such as a conventional wrench, die stock, die handle or the like. The die is placed over the stud and is rotated by the appropriate turning tool to cut threads into the stud or to clean and repair existing threads.

SUMMARY OF THE INVENTION

The die has a bore that is generally sized to fit onto a like-sized stud. Threads are formed on the interior of the bore for cutting or cleaning the threads on the stud. The threads may be formed as split threads rather than as a continuous thread to facilitate the cutting action and to allow the ejection of debris from the die. The die includes an integrated alignment guide to ensure that the die is aligned with respect to the stud as the die is rotated onto the stud. A thread chamfer begins even with or is slightly undercut from the alignment guide. The chamfer is angled to be about two to five threads in depth. The threads on the die may be arranged to be used with either left or right hand threads.

BRIEF DESCRIPTION OF THE DRAWINGS

FIG. 4 is a perspective section view of the embodiment of the die of FIG. 1.

FIG. 5 is a section view taken along a line through the threaded lands of the die of FIG. 1.

DETAILED DESCRIPTION OF EMBODIMENTS OF THE INVENTION

Figure 1:
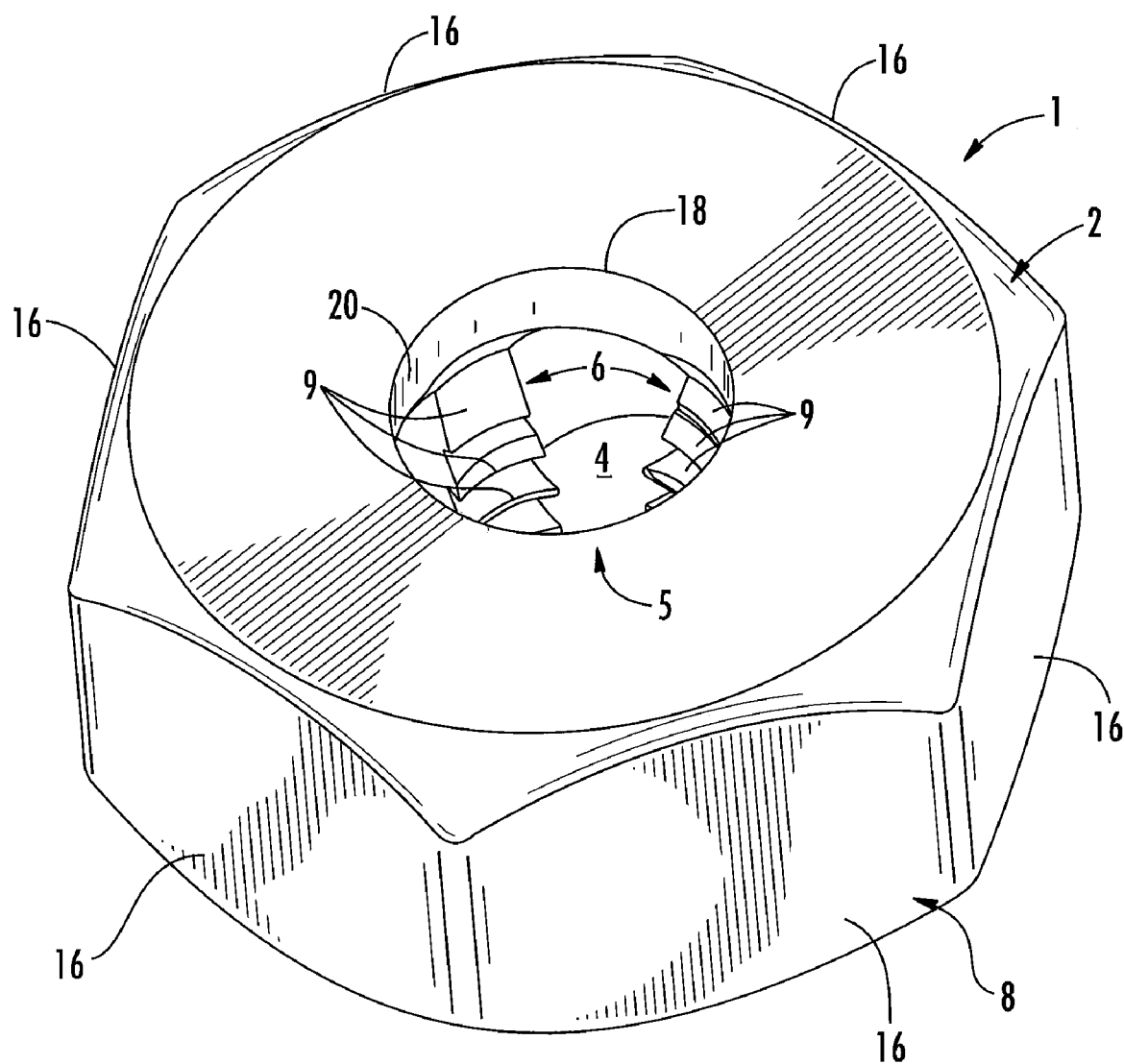
FIG. 1 is a perspective top view of an embodiment of the die of the invention.
Figure 2:
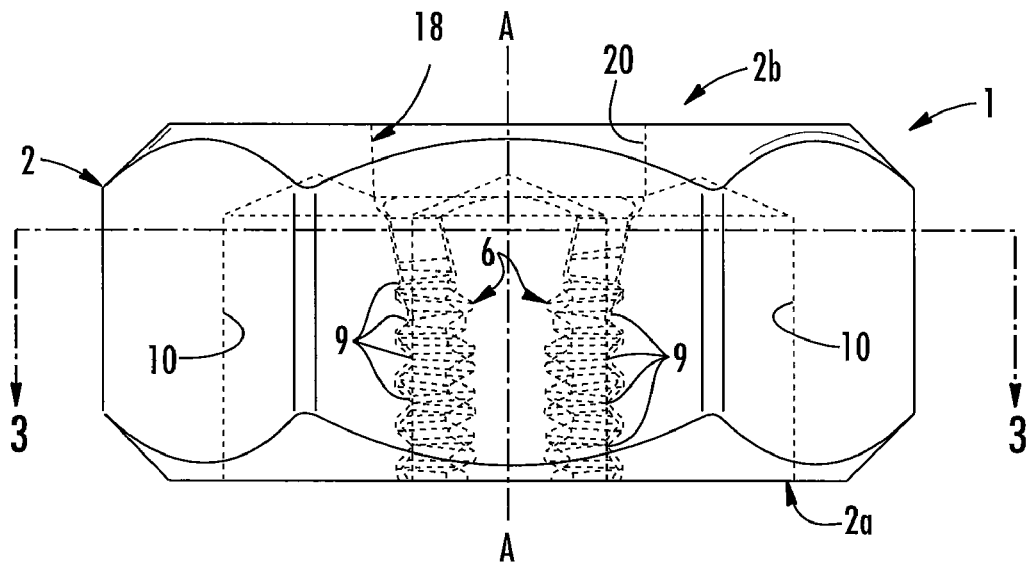
FIG. 2 is a side view of the die of FIG. 1 showing the internal structure in phantom lines.

Referring to FIGS. 1 through 6, an embodiment of the die is shown generally at 1 comprising a body 2 having a bore 4 defining the axis A-A of rotation of the die during use. The body 2 has a first trailing end 2a and a second lead end 2b having the alignment guide 5 formed therein. The "lead end" is the end of the die into which the stud is inserted.

The thread cutting elements 6 engage the stud and cut new threads or chase existing threads on the stud. The thread cutting elements 6 as shown comprise internal threads 9 that engage the stud to cut or repair the threads. The internal threads 9 may be formed as split threads, as shown, or as a continuous thread. Split threads comprise a plurality of threaded lands 9a arranged about the interior of bore 4 and spaced by non-threaded relief sections or flutes 10 that facilitate the cutting action and allow the ejection of debris from the die. The number, angle and size of the flutes can vary depending on the size of the die and the rake angle desired. With split threads the threaded lands 9a are arranged such that the threads of one land are a continuation of the threads of the adjacent lands. The threaded lands 9a extend to the first end 2a but stop short of the second lead end 2b of the die. Thus, unlike in conventional dies, the flutes 10 are blind flutes where the flutes 10 are cut through to the trailing end 2a but do not extend all of the way through the die. The threads 9 may be arranged to be used with either left or right hand threads.

The alignment guide 5 comprises a thickened support structure formed at the lead end 2b of the die. The alignment guide 5 comprises a generally circular aperture 18 that is axial aligned with the central axis A-A of the die 1 and threads 9. The aperture 18 defines an internal wall 20 that closely receives the stud and maintains the alignment of the die 1 with the stud as the die is rotated onto the stud. The diameter of aperture 18 is slightly greater than the major diameter of the threads on the stud. In addition to guiding the die 1 on the stud, the aperture 18 also prevents using the die on a stud that is larger than that intended to be cut by the threads 9. The internal wall 20 has a depth D that is at least 25% of the major diameter $d_m$ of the threads. The major diameter $d_m$ is the distance between the valleys of the opposed threads 9 as shown in FIG. 5. The diameter $d_m$ is substantially equal to the major diameter of the mating threads on the stud.

Figure 3:
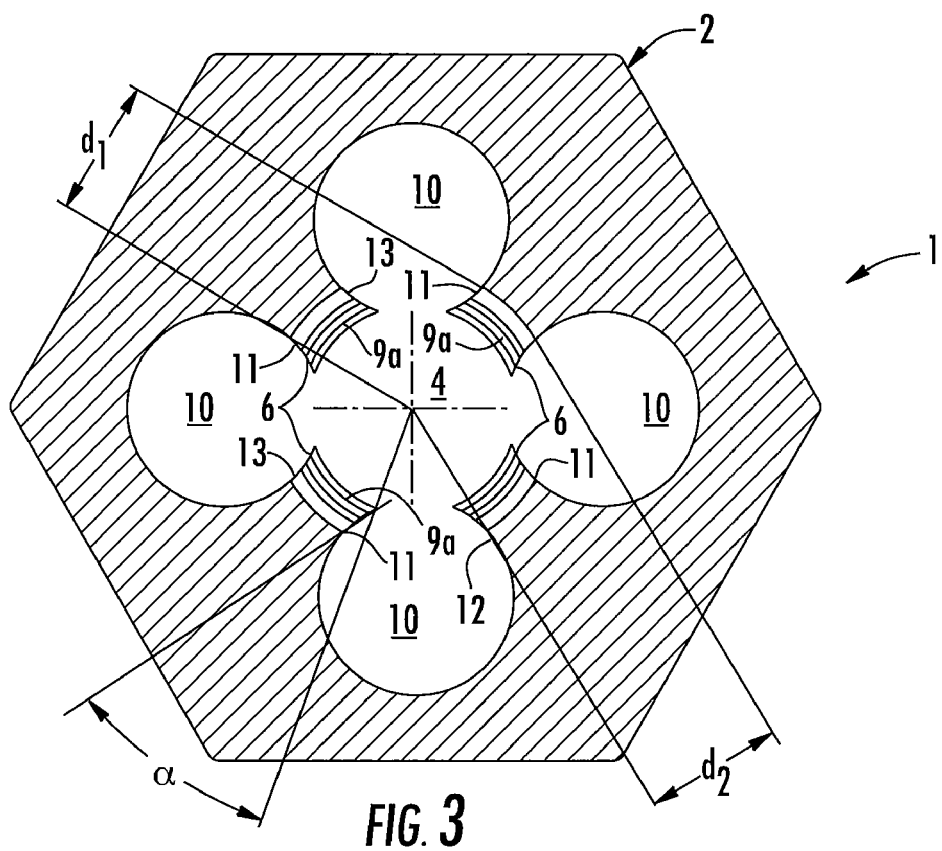
FIG. 3 is a section view taken along line 3-3 of FIG. 2.

Referring to FIG. 3, the threaded lands 9a include a leading edge 11 that is located a first distance $d_1$ from the axis A of the die and a trailing edge 13 that is located a second radial distance $d_2$ from the axis of the die where the first distance is less than the second distance. The difference between the first distance $d_1$ and the second distance $d_2$ is the radial relief. The rake angle α is the angle between the radius to the leading edge 11 and a line parallel to the leading face. The chamfer of the thread section is the surface between the leading edge 11 and trailing edge 13 on each land.

Referring to FIG. 5, the thread chamfer 19 is represented by line C-C and constitutes the tapering of the threaded lands 9a in the area where the stud is inserted into the die. The thread chamfer 19 creates a larger diameter aperture for receiving the stud that gradually tapers to the narrow diameter of the full threads. The chamfer 19 begins even with or is slightly undercut from the alignment guide 5. The chamfer 19 is angled to be about two to five threads in depth. The chamfer 19 creates edges where the threads 9 are cut. The resulting area of the lands 9a defined in the area of the chamfer 19 is relatively small. This is a high stress area of the tool. Because the alignment guide 5 is a relatively thickened area immediately adjacent to the chamfered area, the alignment guide reinforces the threaded land 9a in this area.

Figure 9:
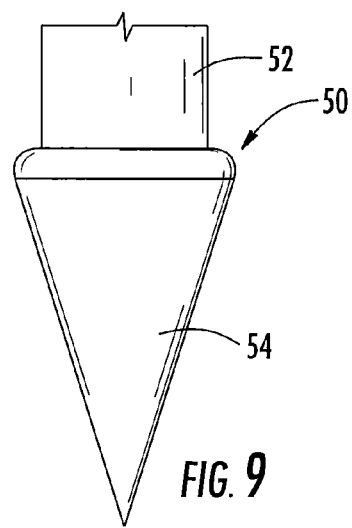
FIG. 9 is a side view of a cutting tool for creating the chamfer in the threads of the die of the invention.
Figure 10:
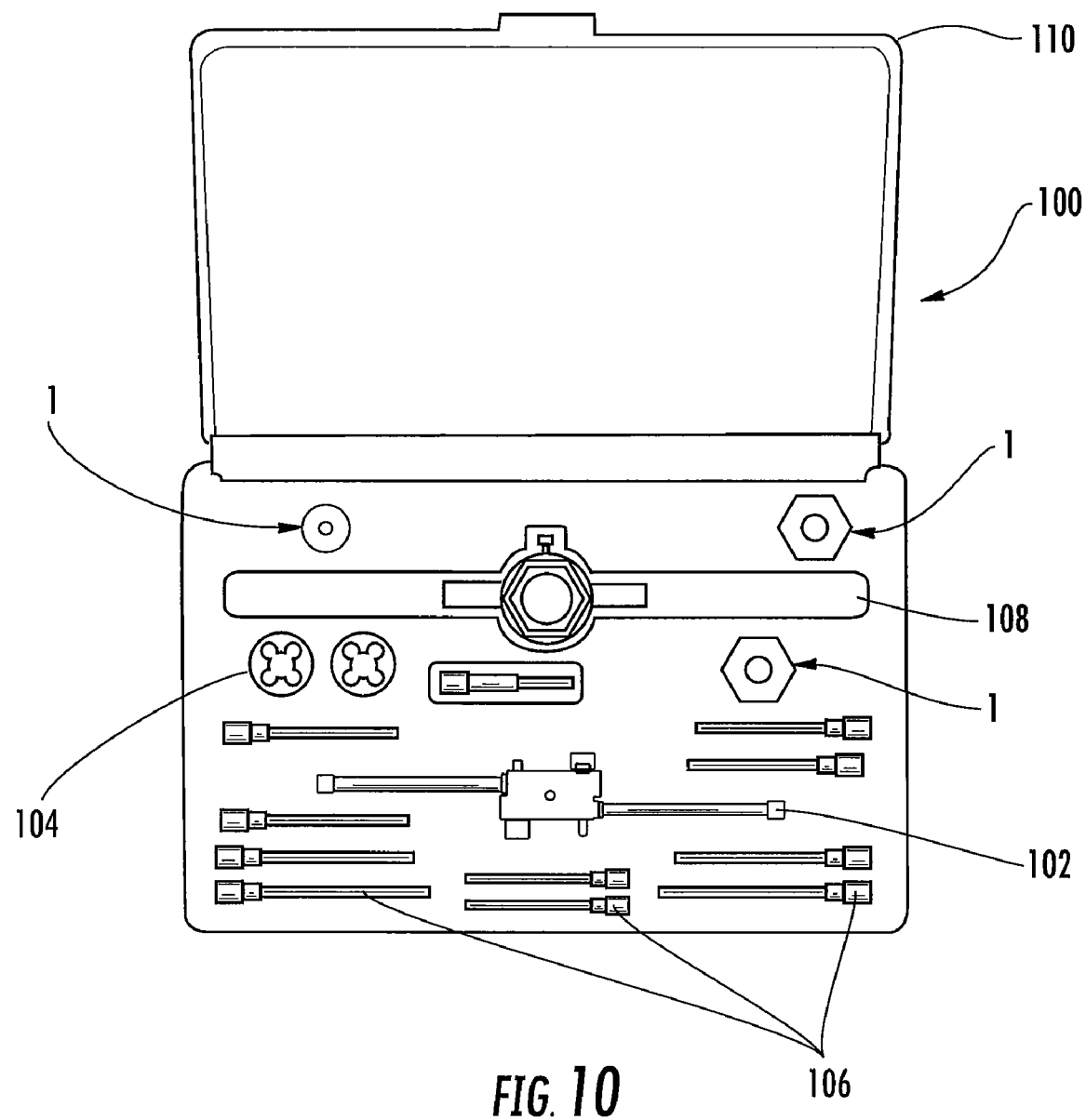
FIG. 10 is a plan view of a kit with a die as shown in FIG. 1.
Figure 11A:
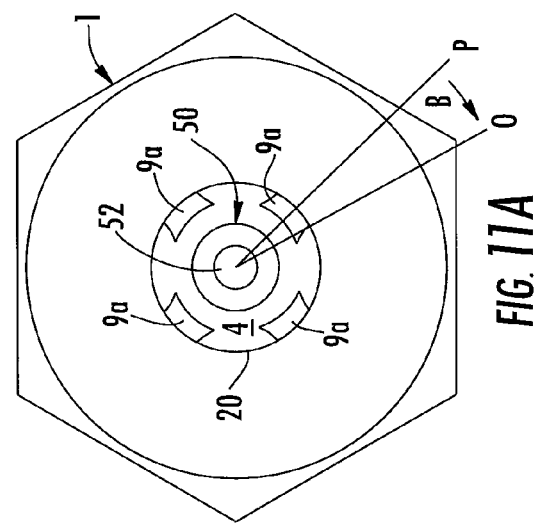
FIG. 11a-11d show a method of making the die of FIG. 1.
Figure 11B:
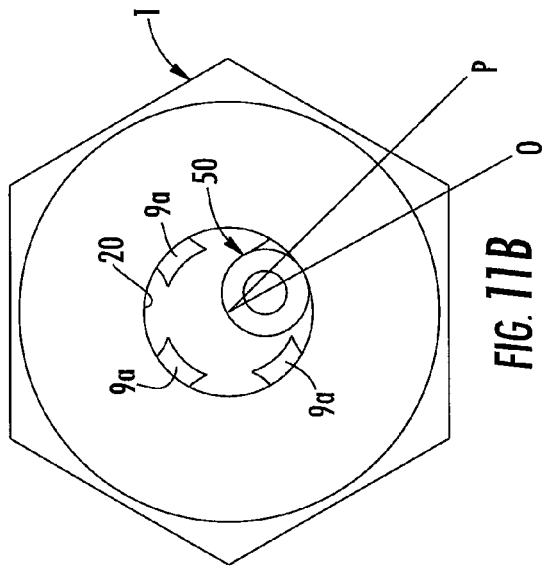
Figure 11C:
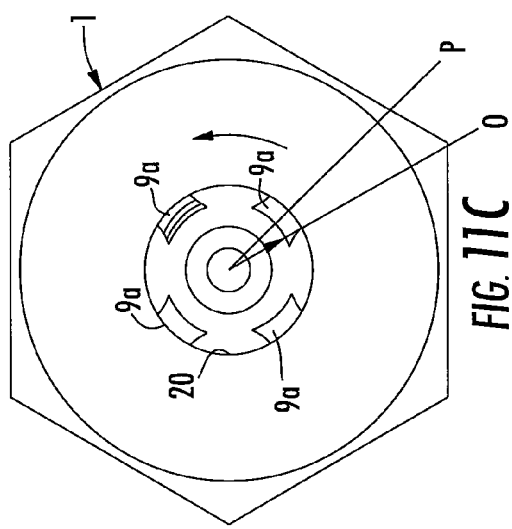
Figure 11D:
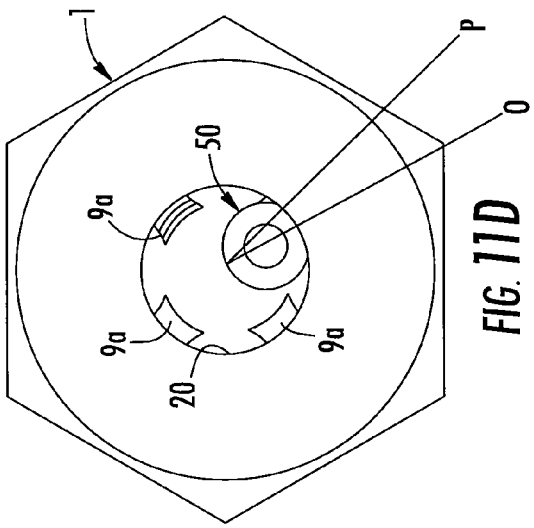

Referring to FIGS. 11a-11d, the thread chamfer 19 for each threaded land 9a is created by first locating the plane P that extends through the axis of the die and the center of the land. The chamfer cutting tool 50, shown in FIG. 9, is inserted into bore 4 along axis A-A. The die is rotated counterclockwise the amount of the chamfer offset angle β. The chamfer offset angle is set to get the appropriate radial relief ($d_1$-$d_2$). The chamfer cutting tool 50 is fed along the chamfer offset plane O into engagement with the threaded land 9a to cut chamfer 19 as shown in FIG. 11b. The chamfer cutting tool 50 is returned to the center of the die as shown in FIG. 11c. The die is rotated relative to the cutting tool to align the offset plane O of the next land 9a with the cutting tool 50. The steps are repeated for the other lands.

Referring to FIG. 9, to create a complete cylinder in the alignment area, the cutting tool 50 must have a shank 52 with a smaller diameter than the maximum outer diameter of the cutting head 54. The cutting head 54 may be provided with curved or straight flutes. By using a cutting tool as shown in FIG. 9 the cutting head 54 is disposed below the alignment guide 5 such that the cutting head 54 does not contact the alignment guide but undercuts the chamfer into the threaded lands.

The outside of body 2 is formed with a turning tool coupling mechanism 8 for connecting the thread chaser to a turning tool such as a conventional wrench, socket wrench, tap wrench, tap handle or the like. In the illustrated embodiment the coupling mechanism 8 comprises a coupler having flat faces 16. Other coupling mechanisms may be used depending on the turning tool that is to be used with the thread chaser. For example the coupling mechanism 8 may be round or it may have a fewer or greater number of flat faces.

Figure 7:
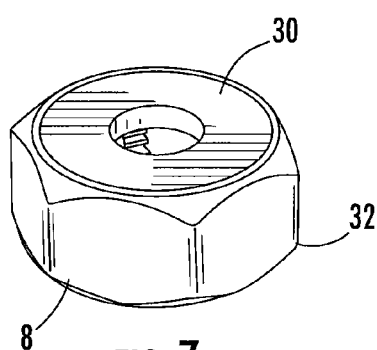
FIG. 7 is a perspective view of an alternate embodiment of the die of the invention.
Figure 8:
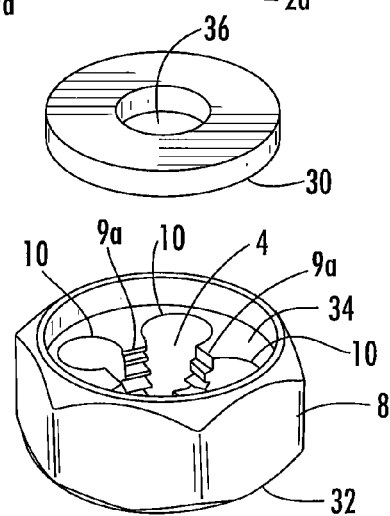
FIG. 8 is an exploded perspective view of the embodiment of the die of FIG. 6.

The integrated alignment guide 5 could be formed integrally with the die as shown in FIGS. 1 through 6. "Integrally" as used herein means that the alignment guide and the body of the die are formed as a single, unitary piece. Alternatively, the integrated alignment guide may be formed as a separate element 30 as shown in FIGS. 7 and 8 and permanently attached to the body 32 of the die. In the illustrated embodiment the alignment guide 30 is located in a recess 34 formed in the top of the die body 32. The top of the die body 32 may also be flat with the alignment guide 30 attached to the flat surface. The alignment guide 30 is formed as a rigid plate having a centrally located aperture 36 that is structured and operates in the same manner as the alignment guide 5 and aperture 18 previously described with respect to FIGS. 1 through 6. The plate is mounted to the body 32 such that aperture 36 is aligned with bore 4 located in body 32. Body 32 includes the threaded lands 9a, flutes 10 and coupling mechanism 8 as previously described with respect to the embodiment of FIGS. 1 through 5. The alignment section 32 could be attached to the body 32 by a permanent securing mechanism such as welding, fusing, adhesive or other suitable mechanism.

Figure 6:
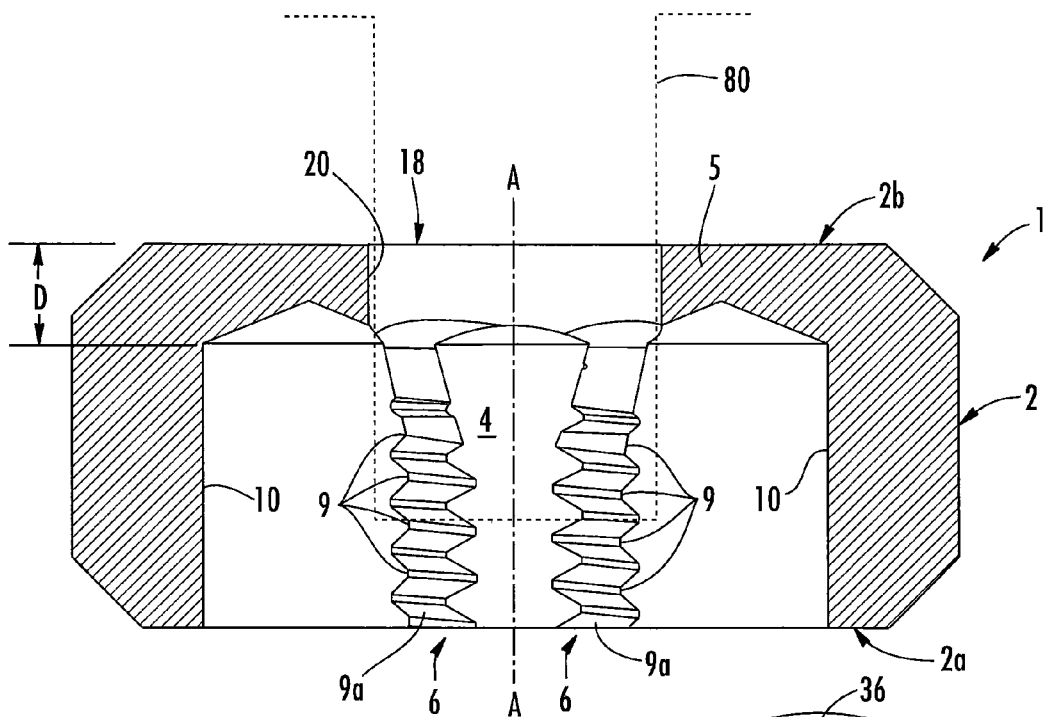
FIG. 6 is a section view taken along a line through the flutes of the die of FIG. 1.

Referring the FIGS. 5 and 6 the die 1 is shown mounted on a stud 80. The stud 80 may have previously cut threads formed thereon that may be damaged, rusted, obstructed by debris or otherwise inoperable. Stud 80 may also comprise unthreaded virgin stock. The stud 80 is inserted into the leading end 2b of die 1 and the die is rotated such that threads 9 engage the stud. The coupling mechanism 8 can be gripped by a turning tool such as tap wrench. When the stud is inserted into the die and the die is threaded onto the stud 80, the stud extends into the alignment guide 5 where it is closely received within the aperture 18. Because the stud 80 is closely received in aperture 18 and wall 20 has substantial height, the die 1 will not become angularly misaligned with respect to the longitudinal axis of the stud 80 as can occur with existing thread chasers.

Figure 12:
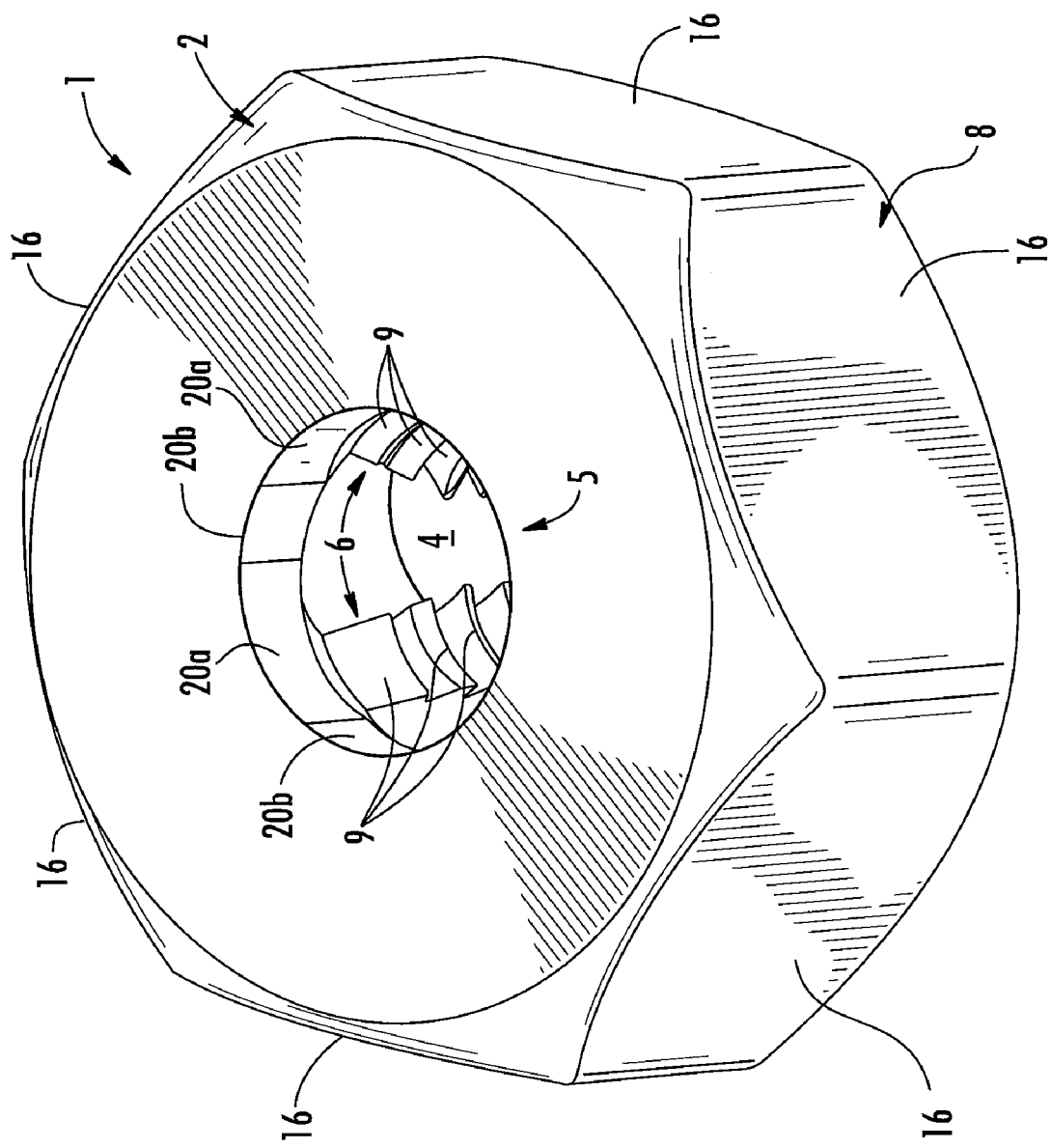
FIG. 12 is a perspective top view of another embodiment of the die of the invention.

Referring to FIG. 12, in an alternate embodiment the internal wall 20 has two different portions. The first portions 20a are aligned with the chamfers and are machined in a curve that matches the chamfer offset angle of the threads 9. In the illustrated embodiment there are four chamfer surfaces and four corresponding first wall portions 20a, one wall portion being axially aligned with each chamfer. Interposed between the first wall portions 20a are second wall portions 20b, where the second wall portions 20b are arranged in opposed pairs with the distance between the pairs of second wall portions 20b being equal to the major diameter of the stud on which the die is to be used. Thus, the opposed pairs of second wall portions 20b closely fit around the stud on which the die is used and the first wall portions 20a follow the chamfer of the threads. In this embodiment the first wall portions 20a are cut by the cutting tool when the cutting tool cuts chamfer 19 into the threaded lands 9a rather than undercutting the alignment guide as previously described with reference to FIGS. 9 and 11a-11d.

The die may be made and sold in a variety of sizes such that it can be used on studs/threads of different sizes and pitches. Moreover, the die 1 can be sold individually or as part of a kit 100 as shown in FIG. 9. When sold as part of a kit, the die 1 may be sold with other dies 1 made in accordance with the invention where the dies are of different sizes and/or configurations. The dies may also be sold with other components such as a tap wrench 102, taps 106, handle 108, thread pitch guides or the like. The kit may be packaged in a reuseable case 110 such as a recloseable plastic clam shell. The components may also be sold as subsets of the entire kit.

Specific embodiments of an invention are described herein. One of ordinary skill in the art will recognize that the invention has other applications in other environments. In fact, many embodiments and implementations are possible. The following claims are in no way intended to limit the scope of the invention to the specific embodiments described above.

The invention claimed is:

1. A die for a stud comprising:
   a body having a longitudinal axis and a bore located along the longitudinal axis;
   a thread cutting device formed in said bore and having a major diameter, said thread cutting device comprises threads wherein said threads include a plurality of threaded lands, said lands including a chamfer that comprises a taper of the threaded lands creating a larger diameter aperture for receiving a stud that tapers to a full diameter of the threads, said chamfer extending over between two and five threads of said threaded lands;
   an alignment guide integrated with said body, said alignment guide including an aperture defining a diameter where said diameter is substantially the same as the diameter of the stud with which the die is to be used, said chamfer being undercut relative to the aperture.

2. The die of claim 1 wherein said thread cutting device comprises split threads.

3. The die of claim 1 further including a coupling mechanism for engaging a cutting tool.

4. The die of claim 3 wherein the coupling mechanism includes a plurality of flat faces formed about the periphery of the body.

5. The die of claim 1 wherein the bore receives the stud such that the threads engage the stud when the die is threaded onto the stud.

6. The die of claim 1 wherein said alignment guide is integral with the body.

7. The die of claim 1 wherein said alignment guide is a separate element permanently secured to said body.

8. The die of claim 1 wherein said aperture is defined by a wall, said wall having first wall portions and second wall portions, said first wall portions being different than said second wall portions.

9. The die of claim 8 wherein said first wall portions have the same curve as the threads.

10. The die of claim 8 wherein said second wall portions are spaced approximately the width of the stud to be used with the die.

11. A kit comprising:
a plurality of dies, at least two of said dies comprising:
a body having a longitudinal axis and a bore located along the longitudinal axis;
a thread cutting device formed in said bore said thread cutting device comprises threads where said threads include a plurality of threaded lands, said lands including a chamfer where said chamfer extends over between two and five threads of said threaded lands and is undercut;
an alignment guide integrated with said body, said alignment guide including an aperture defining a diameter where said diameter is substantially the same as the diameter of the stud with which the die is to be used and where the aperture has a height of approximately 25% of the major diameter, said chamfer being undercut relative to the aperture.

12. The kit of claim 11 further comprising a handle.

13. The kit of claim 11 further comprising a closeable case.

14. The kit of claim 11 further comprising a tap.

15. A die for a stud comprising:
a body having a longitudinal axis and a bore located along the longitudinal axis;
split threads formed in said bore, said threads including a plurality of threaded lands having a major diameter, said lands including a chamfer where the diameter of the threads tapers, said chamfer extending over between two and five threads of said threaded land; and
an alignment guide integrated with said body said alignment guide being disposed immediately adjacent said chamfer, said alignment guide including an aperture defining a diameter where said diameter is substantially the same as the diameter of the stud with which the die is to be used and where the aperture has a height of approximately 25% of the major diameter, said chamfer being undercut relative to the aperture.

16. A die for a stud comprising:
a body having a longitudinal axis and a bore located along the longitudinal axis;
a thread cutting device formed in said bore and having a major diameter;
an alignment guide integrated with said body, said alignment guide including an aperture defining a diameter where said diameter is substantially the same as the diameter of the stud with which the die is to be used and where the aperture has a height of approximately 25% of the major diameter, said aperture being defined by a wall where said wall has a first wall portion and a second wall portion, said first wall portion being different than said second wall portion.

* * * * *